(12) United States Patent
Laud

(10) Patent No.: US 9,001,270 B2
(45) Date of Patent: Apr. 7, 2015

(54) DATA ANALYZING AND/OR COMBINED MAIN/MOBILE RECEIVING

(75) Inventor: Timothy G. Laud, Libertyville, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 516 days.

(21) Appl. No.: 12/969,794

(22) Filed: Dec. 16, 2010

(65) Prior Publication Data

US 2012/0154686 A1  Jun. 21, 2012

(51) Int. Cl.
*H04L 1/00* (2006.01)
*H04L 1/24* (2006.01)

(52) U.S. Cl.
CPC ............. *H04L 1/007* (2013.01); *H04L 1/245* (2013.01)

(58) Field of Classification Search
None
See application file for complete search history.

(56) References Cited

U.S. PATENT DOCUMENTS

| | | | | |
|---|---|---|---|---|
| 7,653,055 B2 * | 1/2010 | Guo et al. | | 370/389 |
| 2009/0204393 A1 * | 8/2009 | Fascenda et al. | | 704/201 |
| 2009/0323729 A1 * | 12/2009 | Simon et al. | | 370/509 |
| 2010/0085868 A1 * | 4/2010 | Guo et al. | | 370/216 |
| 2010/0135375 A1 * | 6/2010 | Lee et al. | | 375/231 |
| 2010/0226443 A1 * | 9/2010 | Citta et al. | | 375/240.26 |
| 2010/0231803 A1 * | 9/2010 | Citta et al. | | 348/723 |
| 2010/0246664 A1 * | 9/2010 | Citta et al. | | 375/240.01 |
| 2011/0149817 A1 * | 6/2011 | Song et al. | | 370/310 |
| 2012/0069196 A1 * | 3/2012 | Carmel et al. | | 348/193 |
| 2012/0176541 A1 * | 7/2012 | Lee et al. | | 348/474 |

* cited by examiner

*Primary Examiner* — Jay Patel
*Assistant Examiner* — Reza Aghevli

(57) ABSTRACT

Mobile/handheld (M/H) data is received in an M/H frame equivalent in size to exactly 20 VSB data frames. Each VSB frame contains an odd VSB field and an even VSB field, and each of the VSB fields includes one field sync segment and 312 data segments. The M/H frame includes main data and M/H data, and the M/H data has more robust coding than the main data. The M/H frame is received and an MPEG encoded transport stream derived therefrom is outputted. Frame registration is found so as to find a structure of the M/H frame in the MPEG encoded transport stream. Based on the structure of the M/H frame, the M/H data is randomized. Based on the structure of the M/H frame, block mode data is located within the randomized M/H data. The M/H data is decoded using the block mode data.

16 Claims, 1 Drawing Sheet

DATA ANALYZING AND/OR COMBINED MAIN/MOBILE RECEIVING

RELATED APPLICATION

The present application contains disclosure similar to disclosure contained in application (7290).

TECHNICAL FIELD

Data analyzing such as might be used to verify proper operation of a transmitter and combined main/mobile receiving such as might be used to receive both main data and mobile data under the ATSC A/153 part 2 Standard are described herein.

BACKGROUND

The ATSC transmission scheme set out in the ATSC A/53 Standard involves the use of 8-VSB modulation in transmitting terrestrial and cable broadcasts for digital television receivers. An ATSC A/53 field (an ATSC A/53 frame has an odd field and an even field) contains a field sync segment and 312 data segments each beginning with a segment sync. The data segments also include main data. ATSC A/53 is optimized for fixed reception.

Unfortunately, transmissions according to this standard are not robust enough against doppler shift and multipath radio interference in mobile environments because it is designed for slowly varying signal conditions. In order to provide robust reception in spite of doppler shifts and multipath radio interference in mobile environments, additional channel coding mechanisms are introduced in the ATSC a/153 Standard to protect the signal.

The A/153 Standard describes the ATSC Mobile DTV system referred to in the Standard as the ATSC mobile/handheld (M/H) system. The M/H system provides mobile/pedestrian/handheld broadcasting services using a portion of the ATSC 8-VSB payload, while the remainder is still available for HD and/or multiple SD television services. The M/H system is a dual-stream system that includes the ATSC service multiplex for existing digital television services and the M/H service multiplex for one or more mobile, pedestrian and handheld services.

Thus, the ATSC A/153 Standard known as ATSC-M/H is a standard for mobile digital televisions that allows television broadcasts to be received by mobile devices. ATSC-M/H is an extension to the available digital TV broadcasting standard ATSC A/53.

According to Part 2 of the A/153 Standard, one M/H Frame can carry main data (processed in accordance with the A/53 Standard) and M/H data (processed in accordance with the A/153 Standard) and is equivalent in size to exactly 20 VSB data frames. The M/H Frame consists of five consecutive Sub-Frames such that each Sub-Frame contains the same amount of data as four VSB data frames or eight A/53 data fields. Each Sub-Frame consists of sixteen consecutive M/H Slots. Each M/H Slot consists of 156 transport stream packets or equivalently 156 data segments at the symbol level, i.e., equivalent to one half of a A/53 data field. A particular Slot may contain M/H data, a combination of M/H data and main data, or only main data. If an M/H Group is transmitted during an M/H Slot, then the first 118 transport stream packets in the Slot belong to an M/H Group, and the remaining 38 packets are main data packets. If there is no M/H Group in an M/H Slot, the M/H Slot contain 156 main data packets. As in the case of an A/53 field, an A/153 field has a field sync segment and each data segment includes a segment sync portion.

There is no method to verify that all of the M/H data is properly placed in the frame. Current receivers output decoded data or decoded FIC (Fast Information Channel) data. TPC (Transmission Parameter Channel) data is available on a sub-sampled register basis. However, it is not presently possible to verify training signals, M/H RS (Reed Solomon) data, CRC (Cyclic Redundancy Check) data, and/or M/H TP (Transport Packet) header data. Similarly, it has not been possible to check every instance of TPC data or the proper placement and values of FIC data. For debugging, it is important to have the raw data stream to verify the robust coders and proper parameter signaling.

Thus, there has been confusion among transmitter manufacturers as they try to create M/H modulators.

Accordingly, it is desirable to have available a data analyzer that verifies training signals, M/H RS (Reed Solomon) data, CRC (Cyclic Redundancy Check) data, and/or M/H TP header data as well as every instance of TPC data and/or the proper placement and values of FIC data in M/H transmitters.

Moreover, the only option for both main and mobile reception has been the use of two separate receivers, one for main data and one for M/H data.

The ATSC Mobile/Handheld service (M/H) shares the same RF channel as a standard ATSC broadcast service described in ATSC A/53, also known as the "Main service." Hence, main data is data ordinarily transmitted in accordance with the ATSC A/53 standard. M/H data is data that receives extra coding to give the data more robustness than main data. This extra coding conforms to the ATSC A/153 Standard.

Accordingly, it is desirable to have available a single receiver that receivers both main and mobile data.

DETAILED DESCRIPTION

Figure 1:
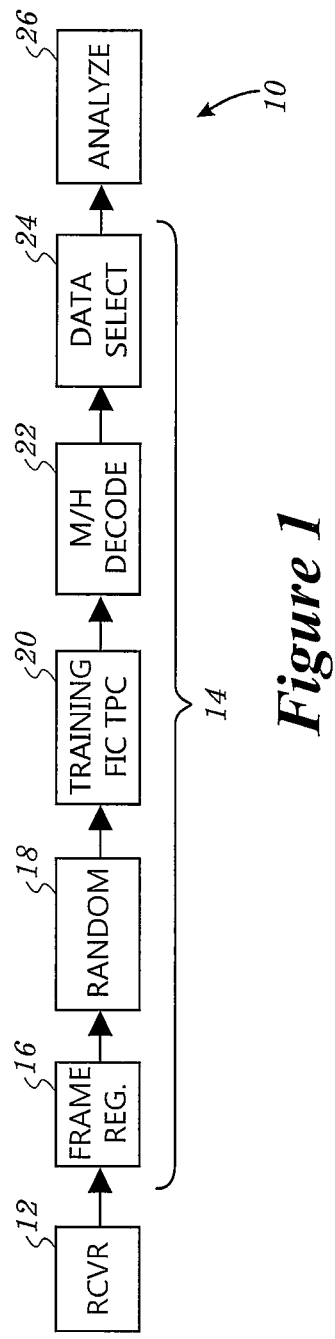
FIG. 1 is a block diagram of a data analyzer that is capable of analyzing M/H data; and, FIG. 2 is a block diagram of a combined Main and Mobile receiver.

As shown in FIG. 1, a data analyzer 10 has a receiver 12 that receives and demodulates the VSB television signal supplied by a VSB transmitter. The receiver 12, for example, may be a receiver manufactured according to the ATSC Digital Televisions Standard A/53. As such, the output of the receiver 12 is an MPEG transport stream.

The MPEG transport stream from the receiver 12 is provided to a processor 14 such as a post-processor. The processor 14 includes a frame registration find block 16, a randomization block 18, a training sequence, FIC, and TPC block 20, an M/H decode block 22, and a data select block 24. The processor 14, for example, may be one or more elements of a computer. The computer for example, may include memory, one or more input devices such as a mouse and/or a keyboard, one or more output devices such as a display and/or a printer, one or more processing elements such as a microprocessor, etc. In this case, the blocks of the processor 14, for example, may be blocks of code executed by the processor 14. Alternatively, each of the blocks of the processor 14 or various combinations of the blocks of the processor 14 may be hardware and/or firmware such as ASICs or other ICs.

The frame registration find block 16 finds the frame registration (i.e., location or structure of the frame) in the MPEG transport stream provided by the receiver 12. Finding frame registration enables the processor 14 to find the location of the mobile data whose value and position in the transport stream frames is to be verified to ensure proper operation of the transmitter. The frame registration find block 16 may find the frame registration in a number of ways.

For example, the frame registration find block 16 may locate the training sequence in the MPEG transport stream provided by the receiver 12. The location of the training sequence in the MPEG transport stream provided by the receiver 12 is predetermined even though the MPEG transport stream provided by the receiver 12 is deinterleaved by the receiver 12. Because the training sequence has a predetermined location in the frame, the frame structure within the MPEG transport stream provided by the receiver 12 is easily determined.

Alternatively, if the receiver 12 is configured to provide an output corresponding to the frame sync of a frame, the frame registration find block 16 can use the frame sync to easily find the frame structure within the MPEG transport stream provided by the receiver 12.

As another alternative, the frame registration find block 16 can find the PID that identifies the packets containing mobile data. Because the mobile data has predetermined locations within the frame, the frame registration find block 16 can use the mobile PID to easily locate the frame structure within the MPEG transport stream provided by the receiver 12.

Once the frame structure is located within the MPEG transport stream provided by the receiver 12, the M/H data in the located frame structure is randomized by the randomization block 18. The receiver 12, as one its final processing steps, derandomizes the transport stream. However, the transmitter does not randomize the mobile (M/H) data that it transmits. Therefore, the mobile data in the transport stream provided by the receiver 12 is not correctly represented. Accordingly, the randomization block 18 reverses the derandomization of the mobile data performed by the receiver 12 and returns the mobile data to its correct representation. The randomization block 18 is a byte scrambler. At this point, the processor 14 now knows where some of the MH data is, although the value of this data is not known.

Because the location of the frame structure is determined by the frame registration find block 16 and because the mobile data is returned to its correct representation by the randomization block 18, the training sequence, FIC, and TPC block 20 is able to locate and strip the training sequence, the FIC data, and the TPC data from the transport stream. The FIC data essentially indicates the service locations in the MH Frame, and the TPC data provides a map that indicates where the main and mobile data are packed into the frame. The TPC data also indicates the SCCC (Series Concatenated Convolutional Code) block mode. The training sequence is useful in training the equalizer of a receiver.

The TPC basically indicates to the processor 14 where the M/H data is and how to decode it. The FIC indicates to the processor 14 where the programs are in the mobile parades and may repeat several times per frame. However, because neither the TPC nor the FIC is actual program data, they are not included in any output stream.)

One M/H Block of data can constitute a single SCCC Block or two M/H Blocks of data can constitute a single SCCC Block. The SCCC Block Mode identifies the relationship between the M/H Block and the SCCC block. If the SCCC Block Mode is equal to '00' (separate), then each SCCC Block consists of a single M/H Block. If the SCCC Block Mode is '01' (paired), then two M/H Blocks constitute a single SCCC Block.

The M/H decode block 22 uses the SCCC block mode to determine the relationship between the M/H blocks and the SCCC blocks in order to decode the M/H data using the SCCC. The M/H decode block 22 may also be arranged to perform the functions specified in A/153 part 2, section 5.3.2 to 5.3.2.6. The data select block 24 selects the M/H payload to be verified.

The M/H data to be verified generally includes the TPC data, the FIC data, the RS (Reed Solomon) Blocks, and/or the training sequence. Current receive chips output decoded data and decoded FIC data. TPC data is available on a sub-sampled basis. However, it has not been possible to verify the training sequence, M/H RS data, CRC data, and M/H TP header data. Similarly, it has not been possible to verify every instance of TPC data or the proper value and placement of FIC data. For debugging purposes, it is important to have available the raw data stream so that the robust coders and parameter signaling of the transmitter can be verified. The data select block 24 outputs this raw data stream so that the robust coders and parameter signaling of the transmitter can be verified.

Thus, the data select block 24 selects all of the data in the raw data stream provided by the M/H decode block 22. Alternatively, the data select block 24 can select a sub-set of the data available in the raw data stream provided by the M/H decode block 22. For example, it may not be desired to verify the Reed Solomon and CRC data. If this is the case, the data select block 24 need not select this data. Also, the M/H decode block need not decode the non-selected data.

An analyzer 26 analyzes the selected data provided by the data select block 24 to determine if the selected data has been properly placed in the frame.

Figure 2:
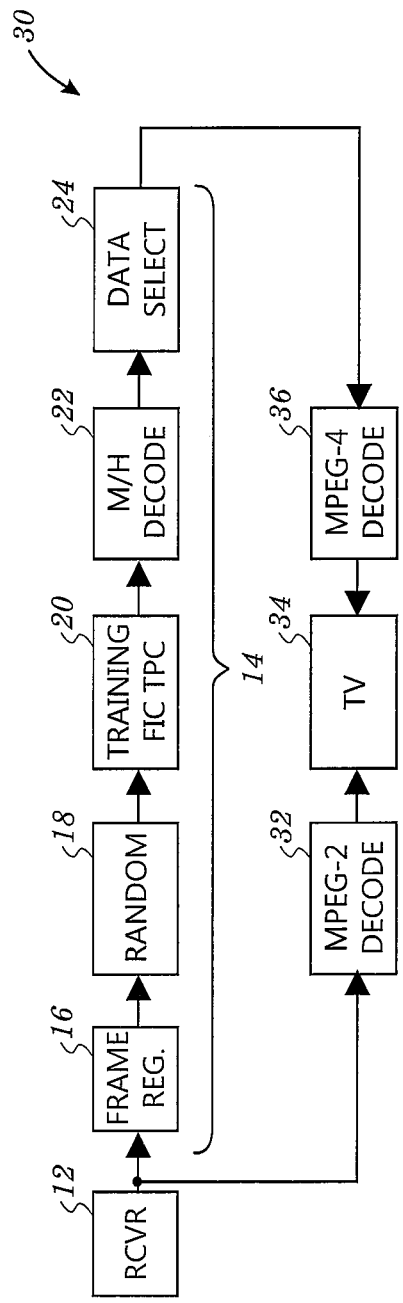

As shown in FIG. 2, a combined main/mobile receiver 30 is arranged to receive both main data (data that has not received the robust extra coding that the mobile data receives) and mobile data (data that has received the robust extra coding). Previously, separate main and mobile receivers were necessary to receive both main and mobile data.

The combined main/mobile receiver 30, for example, includes the same receiver and processor as in FIG. 1 and, hence, the same reference numerals are used to designate common elements. Accordingly, the combined main/mobile receiver 30 includes the receiver 12 and the processor 14 of FIG. 1. Also, the processor 14 includes the frame registration find block 16, the randomization block 18, the training sequence, FIC, and TPC block 20, the M/H decode block 22, and a data select block 24.

For main reception, the MPEG-2 transport packet output of the receiver 12 is provided to an MPEG-2 decoder 32 that uses the decoding specified in the ATSC A/53 Standard to decode the main data and that provides the MPEG-2 decoded data to a television monitor 34. Packets not relevant to the chosen program (such as mobile data) are ignored. For M/H reception, the data select block 24 selects and provides the M/H data to an MPEG-4 decoder 36 that uses the decoding specified in the ATSC A/153 Standard to decode the M/H data and that provides the MPEG-4 decoded data to the television monitor 34. In this way, the user of the television monitor 34 has the option of displaying main data or M/H data on the same television monitor and does not need separate receivers to be able to receive both main and M/H data.

(Both the mobile receiver and the main receiver have a CPU to process the table data (PSIP) to determine what data in the stream is relevant to the current program. The stream entering the MPEG-2 decoder is not scrambled or coded, it is the MPEG-2 transport stream.)

Certain modifications of the present invention have been discussed above. Other modifications of the present invention will occur to those practicing in the art of the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of processing mobile/handheld (M/H) data received by a receiver in an M/H frame equivalent in size to 20 VSB data frames, wherein each VSB frame contains an odd VSB field and an even VSB field, wherein each of the VSB fields includes one field sync segment and 312 data segments, wherein the M/H frame includes randomized main data and non-randomized M/H data, and wherein the non-randomized M/H data has more robust coding than the randomized main data, the method comprising:
   receiving a transmitted M/H frame by a receiver and
      outputting on a first path an MPEG encoded transport stream comprising a correct representation of the main data and
      outputting on a second path an incorrect representation of the M/H data, wherein the second path is separate from the first path;
   in the second path, finding frame registration so as to find a structure of the M/H frame in the MPEG encoded transport stream;
   in the second path, based on the structure of the M/H frame, correcting the representation of the M/H data;
   in the second path, based on the structure of the M/H frame, locating block mode data within the correctly represented M/H data; and
   in the second path, decoding the correctly represented M/H data using the block mode data.

2. The method of claim 1, wherein the locating of block mode data within the correctly represented M/H frame comprises locating a training sequence, fast information channel data, and transmission parameter channel data within the correctly represented M/H frame, wherein the fast information channel data indicates service locations in the correctly represented M/H Frame, and wherein the transmission parameter channel data indicates where the main and mobile data are packed into the correctly represented M/H frame.

3. The method of claim 1, further comprising:
   selecting portions of an M/H payload from the decoded correctly represented M/H data; and
   verifying proper value and placement of the selected portions in the correctly represented M/H frame.

4. The method of claim 3, wherein the locating of block mode data within the correctly represented M/H frame comprises locating a training sequence, fast information channel data, and transmission parameter channel data within the correctly represented M/H frame, wherein the fast information channel data indicates service locations in the correctly represented MH Frame, and wherein the transmission parameter channel data indicates where the main and mobile data are packed into the correctly represented M/H frame.

5. The method of claim 1, further comprising:
   MPEG-2 decoding the MPEG encoded transport stream to produce MPEG-2 decoded data;
   selecting portions of an M/H payload from the decoded correctly represented M/H data;
   MPEG-4 decoding the selected portions to produce MPEG-4 decoded data; and
   providing the MPEG-2 decoded data and the MPEG-4 decoded data to a data operator that operates on the data.

6. The method of claim 5, wherein the locating of block mode data within the correctly represented M/H frame comprises locating a training sequence, fast information channel data, and transmission parameter channel data within the correctly represented M/H frame, wherein the fast information channel data indicates program IDs, and wherein the transmission parameter channel data indicates where the main and mobile data are packed into the correctly represented M/H frame.

7. The method of claim 5, wherein the data operator comprises a television.

8. A system that processes transmitted mobile/handheld (M/H) data received in an M/H frame equivalent in size to 20 VSB data frames, wherein each VSB frame contains an odd VSB field and an even VSB field, wherein each of the VSB fields includes one field sync segment and 312 data segments, wherein the M/H frame includes randomized main data and non-randomized M/H data, and wherein the non-randomized M/H data has more robust coding than the randomized main data, the system comprising:
   a receiver that receives the transmitted M/H frame and
      outputs on a first path an MPEG encoded transport stream comprising a correct representation of the main data and
      outputs on a second path an incorrect representation of the M/H data, wherein the second path is separate from the first path;
   in the second path, a frame registrar that finds a structure of the M/H frame in the MPEG encoded transport stream;
   in the second path, a randomizer that corrects the representation of the M/H data based on the structure of the M/H frame;
   in the second path, a block mode data finder that locates block mode data within the correctly represented M/H data based on the structure of the M/H frame; and
   in the second path, a decoder that decodes the correctly represented M/H data using the block mode data.

9. The system of claim 8, wherein the block mode data finder is arranged to locate a training sequence, fast information channel data, and transmission parameter channel data within the correctly represented M/H frame, wherein the fast information channel data indicates service locations in the correctly represented MH Frame, and wherein the transmission parameter channel data indicates where the main and mobile data are packed into the correctly represented M/H frame.

10. The system of claim 8, further comprising:
   a data selector that selects portions of an M/H payload from the decoded correctly represented M/H data; and
   a data verifier that verifies proper value and placement of the selected portions in the M/H frame.

11. The system of claim 10, wherein the block mode data finder is arranged to locate a training sequence, fast information channel data, and transmission parameter channel data within the correctly represented M/H frame, wherein the fast information channel data indicates service locations in the correctly represented MH Frame, and wherein the transmission parameter channel data indicates where the main and mobile data are packed into the correctly represented M/H frame.

12. The system of claim 8, further comprising:
an MPEG-2 decoder that MPEG-2 decodes the MPEG encoded transport stream to produce MPEG-2 decoded data;
a data selector that selects portions of an M/H payload from the decoded correctly represented M/H data;
an MPEG-4 decoder that MPEG-4 decodes the selected portions to produce MPEG-4 decoded data; and
a data operator that operates on the data provided by the MPEG-2 decoded data and the MPEG-4 decoded data.

13. The system of claim 12, wherein the block mode data finder is arranged to locate a training sequence, fast information channel data, and transmission parameter channel data within the M/H frame, wherein the fast information channel data indicates service locations in the MH Frame, and wherein the transmission parameter channel data indicates where the main and mobile data are packed into the M/H frame.

14. The system of claim 12, wherein the data operator comprises a television.

15. A method as claimed in claim 1, wherein said step of receiving receives both robust data and main data, and further comprising:
outputting a main transport stream from the receiver;
decoding the main transport stream in the first signal path to obtain the main data for use in a data operator; and
performing the steps of finding, randomizing, locating and decoding on the main transport stream in the second signal path to obtain the robust data.

16. A system as claimed in claim 8, wherein the decoder is a first decoder to decode correctly represented M/H data, and further comprising:
a second decoder connected to an output of the receiver.

\* \* \* \* \*